US010708320B2

(12) United States Patent
Ivov et al.

(10) Patent No.: US 10,708,320 B2
(45) Date of Patent: Jul. 7, 2020

(54) SELECTIVE INTERNAL FORWARDING IN CONFERENCES WITH DISTRIBUTED MEDIA SERVERS

(71) Applicant: ATLASSIAN PTY LTD, Sydney (AU)

(72) Inventors: Emil Ivov, Austin, TX (US); Boris Grozev, Austin, TX (US)

(73) Assignee: ATLASSIAN PTY LTD, Sydney (AU)

( * ) Notice: Subject to any disclaimer, the term of this patent is extended or adjusted under 35 U.S.C. 154(b) by 166 days.

(21) Appl. No.: 15/634,928

(22) Filed: Jun. 27, 2017

(65) Prior Publication Data
US 2018/0375906 A1 Dec. 27, 2018

(51) Int. Cl.
*H04L 29/06* (2006.01)
*H04L 29/08* (2006.01)
*H04L 12/24* (2006.01)
*H04M 3/56* (2006.01)

(52) U.S. Cl.
CPC ........... *H04L 65/403* (2013.01); *H04L 41/12* (2013.01); *H04L 65/1069* (2013.01); *H04L 65/605* (2013.01); *H04L 67/1008* (2013.01); *H04L 67/327* (2013.01); *H04M 3/566* (2013.01); *H04M 2201/405* (2013.01)

(58) Field of Classification Search
None
See application file for complete search history.

(56) References Cited

U.S. PATENT DOCUMENTS 9,942,519 B1 * 4/2018 Pan ................... H04L 65/1093
2018/0192219 A1 * 7/2018 Mehta .................. H04L 65/604

* cited by examiner

*Primary Examiner* — Jeffrey R Swearingen
(74) *Attorney, Agent, or Firm* — Hickman Palermo Becker Bingham LLP

(57) ABSTRACT

A computer-implemented method comprises establishing, by media servers, a video conference for client computing devices, each media server receiving audio data and video data from a local subset of the client computing devices, selecting, by each media server, a portion of the local subset for which to send audio data to other media servers, sending, by each media server, audio data associated with the portion to other media servers, after receiving audio data from other media servers, generating, by each media server, ordered global list data that identifies each client computing device for which the media server has received audio data, based on the global list data and by each media server to other media servers, sending video data for each client computing device of the local subset that satisfies a threshold value.

19 Claims, 4 Drawing Sheets

SELECTIVE INTERNAL FORWARDING IN CONFERENCES WITH DISTRIBUTED MEDIA SERVERS

FIELD OF THE DISCLOSURE

The technical field of the present disclosure generally relates to improved methods, computer software, and/or computer hardware in telecommunication conferencing. More specifically, the present disclosure relates to computer-implemented techniques for selective internal forwarding in conferences.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video and audio calls and conferences are becoming both more common and larger in size every day. Originally, video calls, audio calls, and conferences hosted using computers were limited to direct connections between users in which a first user called a second user, enabling the users to see and hear each other during the call. As methods improved, conferences of five, ten, or more users all with streaming video and audio became more common. Simply sending all video and audio data from each participant to every other participant in such a large conference often is not feasible due to limitations on network bandwidth in local area networks and internetworks and the limited processing power in some client computing devices.

In response, solutions to large video and audio conferences were implemented with media servers using two general approaches: multipoint control units (MCU) and selective forwarding units (SFU). MCUs receive and process audio and video data from clients and typically mix the audio and video to create a single composite video. The composite video is then streamed to the clients in a single mix. While this solution enables relatively simple client software, the processing power needed for the MCU is high, and the resulting presentation at the client is generally inflexible. SFUs, in contrast, are more similar to packet data routers, as SFUs forward packets without media processing.

Another, or additional, solution is to use multiple media servers for a single video or audio conference, thereby sharing the computing workload. However, using multiple media servers for a single video or audio conference may result in inefficient use of bandwidth. Improvements for conferences using multiple media servers are needed.

DETAILED DESCRIPTION

Figure 1:
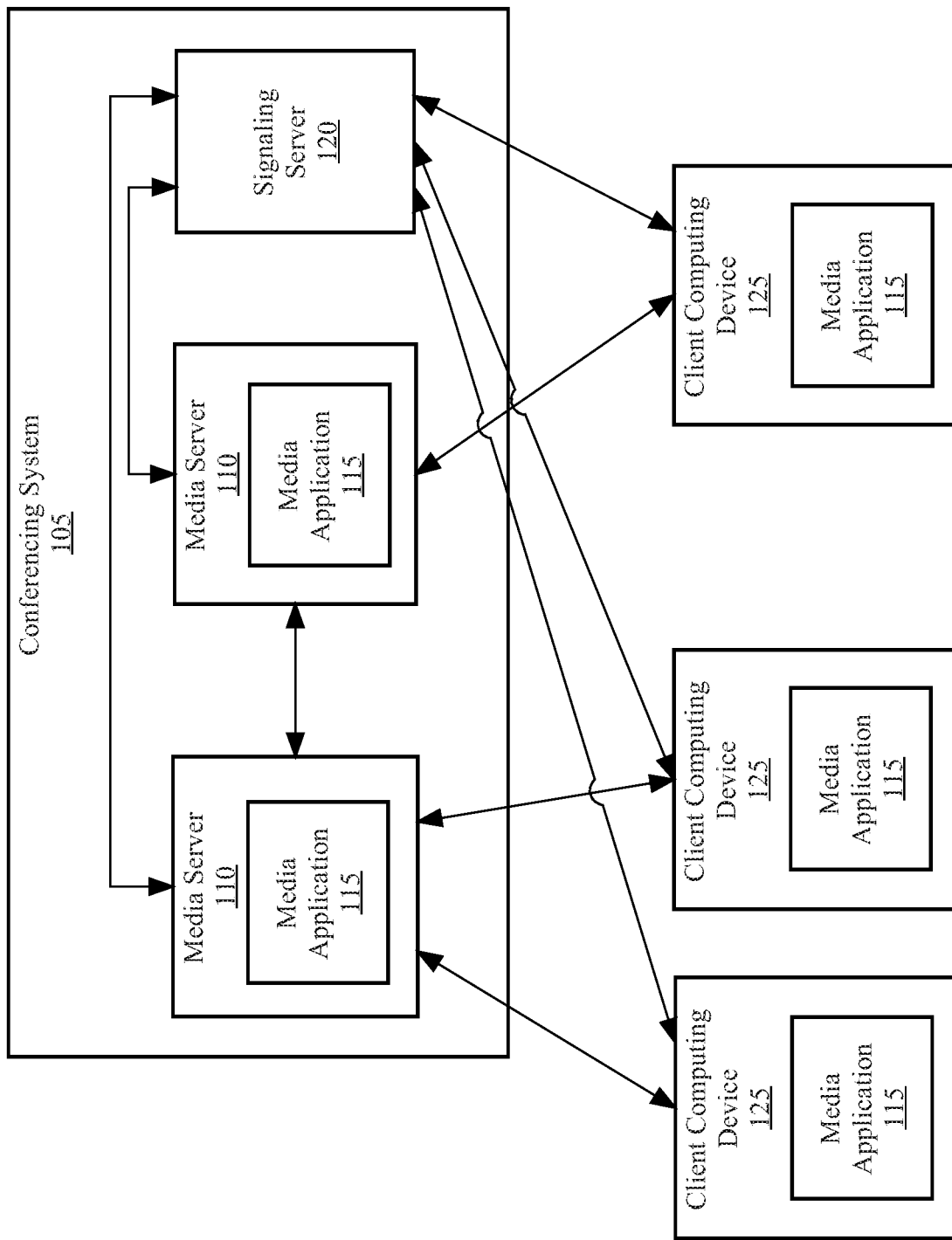
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. OVERVIEW
2. EXAMPLE COMPUTER SYSTEM IMPLEMENTATION
3. EXAMPLE FUNCTIONAL IMPLEMENTATION
4. EXAMPLE SELECTIVE INTERNAL FORWARDING IN CONFERENCES
5. HARDWARE OVERVIEW 1. Overview Computer-implemented techniques are provided for selective internal forwarding in conferences. Internal forwarding occurs when media data is sent between the various media servers in a conference. In various embodiments, a video or audio conference having multiple participant client computing devices is established using multiple media servers. A conference using multiple media servers may be referred to as a distributed conference. Each media server is in direct communication with zero or more local client computing devices. When a client computing device is local to a particular media server, the client computing device sends media data to that particular media server, and does not send media data to any of the other media servers in the conference. Instead, the media server that receives the media data from the local client computing device decides whether or not the media data should be selectively forwarded to the other media servers of the conference. The selection may be based on any suitable factor, and each media server makes the selection independently of any other media servers. The media data that is selectively forwarded, or sent, to other media servers may be audio data, video data, or both audio and video data.

In one embodiment, a computer-implemented method comprises establishing, by a plurality of media servers, a video conference for a plurality of client computing devices, each of the plurality of media servers receiving audio data and video data from a local subset of the plurality of client computing devices, selecting, by each of the plurality of media servers, a portion of the local subset for which to send audio data to other media servers of the plurality of media servers, sending, by each of the plurality of media servers, audio data associated with the portion to other media servers of the plurality of media servers, after receiving audio data from other media servers of the plurality of media servers, generating, by each of the plurality of media servers, ordered global list data that identifies each client computing device of the plurality of client computing devices for which the media server has received audio data, based on the global list data and by each of the plurality of media servers to other media servers of the plurality of media servers, sending video data for each client computing device of the local subset that satisfies a threshold value.

Other embodiments, aspects and features will become apparent from the disclosure as a whole.

2. Example Computer System Implementation

FIG. 1 illustrates a system in which the techniques described may be practiced, according to one embodiment.

In an embodiment, conferencing system 105 comprises components that are implemented at least partially by hardware at one or more computing devices, such as media servers 110, or one or more hardware processors, executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates conferencing system 105, media servers 110, media application 115, signaling server 120, and client computing device 125. Conferencing system 105 may execute on any computing device or devices, including but not limited to: servers, racks, work stations, personal computers, general purpose computers, laptops, Internet appliances, wireless devices, wired devices, multi-processor systems, mini-computers, and the like. Although FIG. 1 shows conferencing system 105 as a single element, conferencing system 105 broadly represents one or multiple computing devices, and may be located in one or more physical locations. Conferencing system 105 also may represent one or more virtual computing instances that execute using one or more computers in a datacenter such as a virtual server farm. Conferencing system 105 may be connected through any kind of computer network using any combination of wired and wireless communication, including, but not limited to: a Local Area Network (LAN), a Wide Area Network (WAN), one or more internetworks such as the public Internet, or a company network.

Generally speaking, conferencing system 105 provides conferencing services to any client computing device that connects to the conferencing system and acts as a bridge or relay for enabling the participants to communicate. The conferences may be video conferences, audio conferences, a combination thereof, or any other type of conference. The size of the conference may be from two participants to hundreds of participants or more. During a conference, connected client computing devices send media data to conferencing system 105, and conferencing system 105 directs the media data to the other participants as needed. The media data may include video data, audio data, or a combination thereof. Additional details of the components and functionalities of conferencing system 105 is discussed below.

Media servers 110 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although FIG. 1 shows media servers 110 as individual devices, each media server 110 may be multiple devices, such as a server cluster, and may be located in one or more physical locations. Media servers 110 may host or execute a media application 115, and may include other applications, software, and other executable instructions to facilitate various aspects of embodiments described herein.

In one embodiment, each of the media servers 110 may be a selective forwarding unit (SFU) or multipoint control units (MCU) used for audio or video conferencing. MCUs receive and process audio and video data from clients and typically mix the audio and video to create a single composite video. The composite video is then streamed to clients in a single mix. While this solution enables relatively simple client software, the processing power needed for the MCU is high, and the resulting presentation at the client is generally inflexible. SFUs, in contrast, are more similar to packet data routers, as SFUs forward packets without media processing. Although two media servers are shown in FIG. 1, any number of media servers may be used, such as one, ten, or more. The media servers 110 may be organized or arranged in any fashion, such as a full mesh topology, where each media server communicates with each other media server, or a hierarchy, where each media server has a parent and/or child media server with which it communicates.

The media servers 110 are communicatively connected to signaling server 120, and/or client computing devices 125 through any kind of computer network using any combination of wired and wireless communication, including, but not limited to: a LAN, a WAN, the Internet, or a company network. Each media server 110 is locally connected to a portion of the total client computing devices 125 for a given conference. The portion may be from zero client computing devices 125 to one short of the total client computing devices 125 for a given conference. When locally connected, a media server 110 receives media data directly from the local client computing devices. Other media servers that are not locally connected to a particular client computing device do not receive media data directly from those non-local client computing devices. Rather, any media data that a media server 110 receives that is associated with a non-local client computing device is sent or forwarded from another media server 110. Media servers 110 execute media application 115. Media application 115 is discussed in detail below.

Signaling server 120 is a signaling server used for initiating conferences. Signaling server 120 may be any computing device, and may execute one or more applications (not shown) to provide the functionality needed for the invention described herein. Signaling server 120 may use Session Initiation Protocol (SIP), Extensible Messaging and Presence Protocol (XMPP), Jingle, and/or any other suitable protocol to assist in establishing a conference. As part of initiating a conference, signaling server 120 may receive requests from client computing devices, and determine a media server with which to connect the client computing device. The determination may be based on the load of the media server, the location of a particular media or data item the client wishes to access (such as a media server hosting an audio or video conference), or any other basis. Signaling server 120 may perform any other functionalities as needed to aid in the invention described herein.

Conferencing system 105 may also include additional components that are not shown in FIG. 1, such as a proxy, router, or other device through which media servers 110 may be accessed. The proxy, router, or other device may provide Network Address Translation (NAT) or other functionalities as needed by conferencing system 105. Conferencing system 105 may also include a data store, database, or other storage devices to store any digital electronic data as needed by conferencing system 105. Further, conferencing system 105 may include any other suitable component.

In one embodiment, client computing devices 125 may be any computing devices, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like. Although three client computing devices 125 are shown in FIG. 1, any number of client computing devices may be present. Client computing devices 125 are communicatively connected to signaling server 120 and/or a media server 110 through any kind of computer network using any combination of wired and wireless communication, including, but not limited to: a LAN, a WAN, the Internet, or a company network. Client computing devices 125 may include applications, software, and other executable instructions to facilitate various aspects of embodiments described herein. In one embodiment, client computing devices 125 include client software that is programmed to support video conferencing or audio conferencing, such as media application 115.

Media servers 110 and/or client computing devices 125 may execute media application 115. In some embodiments, other components may execute media application 115 or portions thereof, as needed. Media application 115 is a media application for conferencing. Media application 115 may be available in multiple versions, such as a version for servers and a client version. The client version of media application 115 may be thin-client and accessed through a web browser, or may be thick-client. The server version may be installed and used by a specific company or entity, may be offered over the public Internet via a web browser, or may be part of a Software as a Service (SaaS) implementation where entities sign up for access to the conferencing service. Regardless of which version of media application 115 is in use, the functionalities provided may be the same, although the distribution of work or actions performed by a given media application may vary based on configuration details or the versions used.

Media application 115 is programmed or configured to establish a conference with multiple client computing devices and multiple different media servers. The conference may be an audio or video conference, and involves multiple client computing devices 125 and multiple media servers 110. The conference may be established using any format or manner. For example, Interactive Connectivity Establishment (ICE) and Web Real-Time Communication (WebRTC) may be used. The client computing devices 125 may connect to the media servers 110 in any suitable manner, and in any configuration or distribution. For example, one media server may have three client computing devices connected while another media server has one client computing device connected. When a particular client computing device 125 is connected to a particular media server as part of a conference, this is referred to as local to, or a local device of, that particular media server. A client computing device 125 that is local to a particular media server sends that particular media server media data for the conference and does not directly send media data to other media servers of the conference.

Media application 115 is programmed or configured to send and receive media to and from media servers and client computing devices. The media data may be sent in any format or manner, and may include video data, audio data, or video and audio data. Different types of media data may be sent depending on the situation. For example, when a client computing device is communicating with a media server, both audio and video data may be sent. Likewise, when a media server is communicating with a client computing device, both audio and video data may be sent. However, if a media server is communicating with a different media server, only audio data may be sent, or both video and audio data may be sent. Alternatively, any combination of video data, audio data, or both may be sent, depending on the situation.

Media application 115 is programmed or configured to generate ordered lists of clients. The lists are generated independently by each media server of a conference. Multiple ordered lists may be generated, such as a local list for local clients of each media server and a global list for all clients of a conference of which the media server is aware. The ordered lists may be generated based on any factor or basis, such as audio volume, dominant speaker identification, etc. In the context of video or audio conferences, dominant speaker identification is the process of identifying a current dominant speaker in the conference. Typically, this is the person who is presenting or currently speaking in a conference. The dominant speaker may change during a conference, such as when a presenter takes questions from the audience. Dominant speaker identification is performed using audio data, and may be performed in many different ways, such as by using a decibel value in the header of an audio packet, which are beyond the scope of this patent document. The output of dominant speaker identification may be a score or value that represents how likely a given client computing device is to be the dominant speaker. Media application 115 is programmed or configured to perform dominant speaker identification or other processes needed for generating ordered lists.

Media application 115 is programmed or configured to allow media servers to select or determine for which clients to send media data to other media servers. Media application 115 may make this determination using one or more ordered lists or other factors. The determination may be made using different lists and/or different factors depending on the type of media data being sent. The threshold for whether media data should be sent may be set to any amount, such as a top three clients or any other amount. The threshold may vary based on whether the media data is video data or audio data. In one embodiment, the determination is based on whether the audio data is muted or not. All non-muted audio data of local client computing devices may be sent to other media servers.

For example, audio data uses substantially less bandwidth than video data, and therefore a larger amount of audio data streams may be internally forwarded among the media servers than video data streams, such as audio for 10 client computing devices but video for 5 client computing devices. The determination of whether to forward audio data may be made based on the local list. Thus, the media application 115 of each media server 110 may use an ordered local list to determine that audio data associated with the two highest ranking local clients should be sent to every other media server. All the media servers can then use the received audio data to generate an ordered global list. Then, using the ordered global list, the media application 115 of each media server 110 can determine whether video data of any local clients should be sent to other media servers. For example, video data may be sent to other media servers when a local client ranks in the top five of the ordered global list maintained by the media server. This greatly reduces the bandwidth used in internally forwarding media data amongst media servers of a conference.

As another example, consider a video conference with 50 participants connected to 10 different media servers. The participants are evenly split amongst the media servers. Thus, each media server has 5 local clients. Each media server receives audio and video data from 5 local clients, and generates an ordered local list of the 5 clients. The audio data for the top two clients of each ordered local list is then sent from the media server to the other 9 media servers. Thus, each media server sends two audio data streams, and receives 8 audio data streams. Then, each media server generates an ordered global list for all of the client computing devices for which the media server has audio data for (13 clients in total, 5 local clients provide audio and 8 audio streams are received from other media servers). Using the ordered global list, video data is sent to other media servers for any local clients that are in the top 2 of the ordered global list. Thus, some of the 10 media servers forward on video data to the other media servers (and receive video data from the other media servers as well), while others do not send any video data to other media servers.

Media application 115 is programmed or configured to select or determine which media data to send to local clients. The selection or determination may be based on any factor. For instance, all received video data may be forwarded on to local clients. Alternatively, received video data may be checked against an ordered global list to ensure that the client associated with the video data satisfies a threshold value to send to local clients.

Media application 115 is programmed or configured to send and receive subscription requests. A subscription request indicates that a particular client computing device would like to subscribe to, or receive, the media data of a specific other client computing device. A media application 115 at a client computing device receives the request, such as a selection of the specific other client computing device through a user interface, and sends the request to the local media server. The request may be sent in any format and at any time. The media application 115 at the local media server receives the request, determines a media server associated with the specific other client computing device, and forwards the request to the media server associated with the specific other client computing device. The media server may determine a media server associated with the specific other client computing device using identifiers, contacting signaling server 120, or in any other manner. The media server associated with the specific client computing device subscribes the requesting client computing device to the specific client computing device and begins forwarding media data of the specific client computing device to the media server local to the requesting client computing device. The media server local to the requesting client computing device then sends the media data for the specific client computing device to the requesting client computing device.

Media application 115 is programmed or configured to instruct media servers as to what media data should be forwarded. In this embodiment, media application 115 may execute on a particular media server or signaling server that acts as a centralized conference controller, sometimes referred to as a conference focus. Media application 115 may select or determine what media data is to be forwarded amongst the media servers, and instructions are sent to appropriate media servers so that the desired media data is forwarded. This may be useful in a moderated conference.

3. Example Functional Implementation

Figure 2:
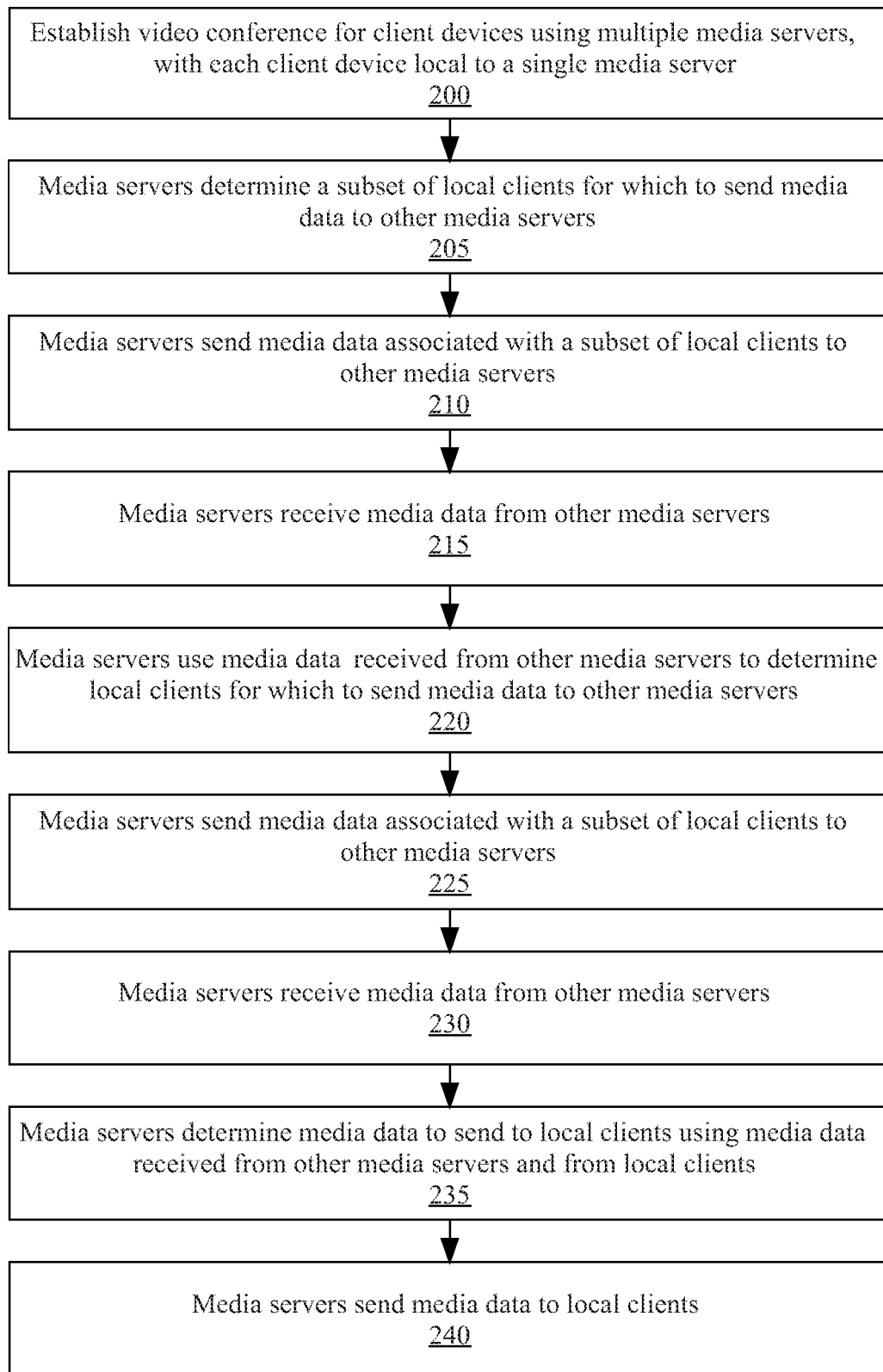
FIG. 2 illustrates a programmable algorithm or method for selective internal forwarding in conferences in accordance with an embodiment.

FIG. 2 illustrates an example programmable algorithm or method for selective internal forwarding in conferences. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, a conference is established for client computing devices using multiple media servers. Any number of client computing devices may connect to the conference, using any kind or type of device. Any number of media servers may be used in the conference, from two to thirty or more media servers. The media servers may be organized in any fashion, such as a full mesh topology, or in a hierarchy. The client computing devices may be distributed amongst the media servers in any manner. However, each client computing device is local to, and thus sends media data to, only a single media server. The client computing devices may not be aware of any other media servers besides their local media server. The conference may be established using any format or method.

In step 205, media servers determine or select a subset of local client computing devices for which to send media data to other media servers. Each media server makes the determination or selection independent of any other media servers. The selection or determination may be based on performing dominant speaker identification, which generates a rating or value representing the likelihood of a given client computing device being the dominant speaker of the conference. This rating or value may then be used to rank local client computing devices in an ordered local list, and media data for a portion of the list is selected for forwarding to other media servers. The media data sent may be only audio data, or may include video data as well. Alternatively, rather than maintaining or using an ordered local list, the selection or determination may be whether or not a local client computing device has muted their audio. If audio for a local client computing device is unmuted, then the audio data for that local client is sent to other media servers. Likewise, if audio for a local client computing device is muted, then the audio data for that local client is not sent to other media servers. Step 205 may be performed continuously, or at a periodic interval, or at any other suitable time. For example, the selection of the subset of local client computing devices for which to send media data may be updated every second or every 5 seconds, to ensure that media data for the proper local client computing devices is sent to other media servers.

In step 210, media servers send the media data of the subset of local client computing devices to other media servers. Each media server of the conference performs step 210 independently. The media data may be sent in any manner or format, and at any time. Step 210 may be performed continuously during the conference. The types of media data and the particular client computing devices for which media data is sent may change at any time, for any reason.

In step 215, media servers receive media data from other media servers. Each media server of the conference performs step 215 independently. The media data may be received in any manner or format, and at any time. Step 215 may be performed continuously during the conference. The types of media data and the particular client computing devices for which media data is received may change at any time, for any reason.

In step 220, using media data received from other media servers, media servers determine or select a subset of local client computing devices for which to send media data to other media servers. Step 220 may be performed using the same method or methods as step 205, except that media data received from other media servers, and thus non-local client computing devices, is considered. Step 220 is performed by each media server of the conference independently. In particular, step 220 is used to generate an ordered global list. The received media data used in step 220 may be audio data. The ordered global list includes all client computing devices of the conference for which a media server has audio data, including local client computing devices. Once generated, the ordered global list is used to determine whether to send video data of a local client computing device(s) to other media servers of the conference. Video data of a local client computing device may be forwarded when a local client computing device satisfies a threshold value of the ordered global list, such as appearing in the top five of the ordered global list.

In step 225, media servers send the media data of the subset of local client computing devices to other media servers. Each media server of the conference performs step 225 independently. The media data may be sent in any manner or format, and at any time. Step 225 may be performed continuously during the conference. The types of media data and the particular client computing devices for which media data is sent may change at any time, for any reason.

In step 230, media servers receive media data from other media servers. Each media server of the conference performs step 230 independently. The media data may be received in any manner or format, and at any time. Step 230 may be performed continuously during the conference. The types of media data and the particular client computing devices for which media data is received may change at any time, for any reason.

In step 235, media servers determine or select media data to send to local clients using media data received from other media servers and from local clients. Each media server performs step 235 independently. The media data selected to be sent to local clients may be based on any suitable factor, such as using the ordered global list. Alternatively, media data received from other media servers may automatically be selected for forwarding to local clients, such as when video data is received from other media servers.

In step 240, media servers send media data to local clients. Each media server of the conference performs step 240 independently. The media data may be sent in any manner or format, and at any time. Step 240 may be performed continuously during the conference. The types of media data and the particular client computing devices for which media data is sent may change at any time, for any reason.

Using this process, the bandwidth used in distributed conferences may be greatly reduced without reducing the effectiveness of the conference. The reduction may be accomplished through selectively forwarding less media data generally. For example, by sending media data of 2 out of 5 client computing devices, rather than all 5 client computing devices, amongst media servers. Alternatively, or in addition, the reduction may be accomplished by sending different types of media data. For example, by sending audio data for some, or all, client computing devices amongst media servers, then selectively sending video data for certain client computing devices. The reduction in bandwidth also reduces the memory and/or computing power needed for conferencing.

Additionally, the invention has another advantage in that no centralized server is required to manage the conference. Each media server independently determines what media data to forward and is therefore able to achieve the above gains in efficiency without needing a centralized server to manage the conference.

4. Example Selective Internal Forwarding in Conferences

Figure 3B:
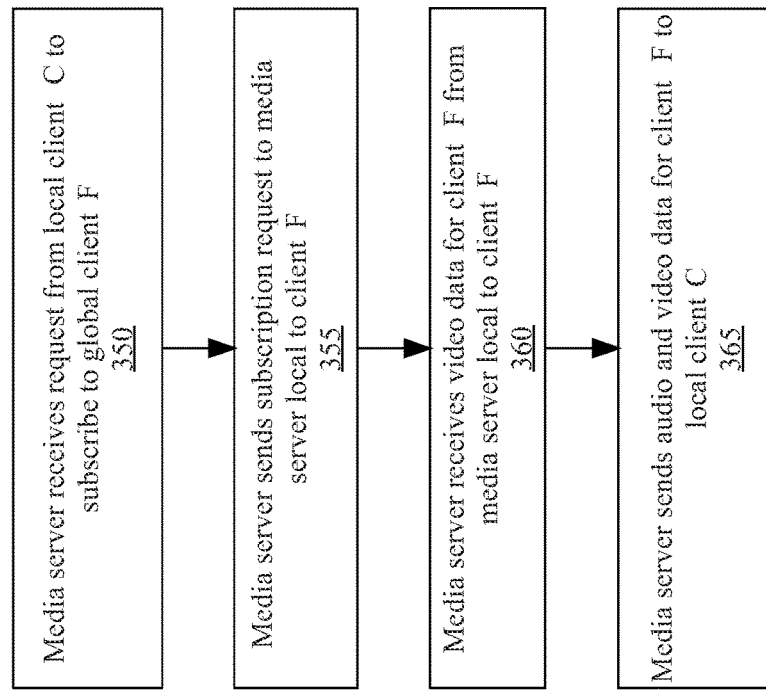
FIG. 3A and FIG. 3B illustrate an example of selective internal forwarding in conferences.
Figure 3A:
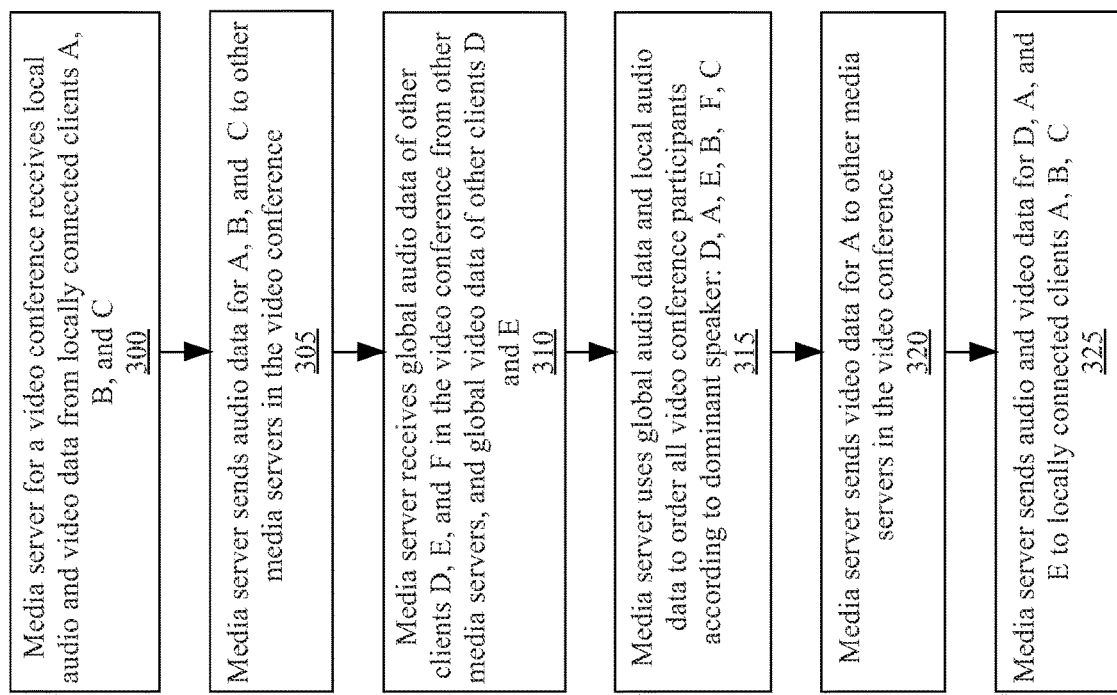

FIG. 3A and FIG. 3B illustrate an example of selective internal forwarding in conferences in accordance with an embodiment.

The example shown in FIG. 3A and FIG. 3B has already had a video conference established. The video conference consists of clients A, B C, D, E, and F. Clients A, B, and C are local to the media server for which the example is written. Clients D, E, and F are local to one or more other media servers. This example forwards all non-muted audio data of local clients to other media devices. Video data, however, is only forwarded when a local client is within the top 3 of the ordered global list, as only 3 videos are displayed at a time on a client computing device.

In FIG. 3A, in step 300, the media server receives local audio and video data from locally connected clients A, B, and C. Once received, in step 305, the media server determines that none of clients A, B, and C have muted audio, and therefore sends the audio data for A, B, and C to other media servers in the video conference. Meanwhile, in step 310, the media server is receiving audio data of non-local clients D, E, and F, and video data for non-local clients D and E. The audio data is received because each of those clients have unmuted audio. The video data is received because other media servers have already determined that clients D and E are dominant speakers and should have video displayed in the conference, and therefore are forwarding video data for clients D and E.

In step 315, the media server uses the received audio data of non-local clients D, E, and F, and the audio data of local clients A, B, and C to perform dominant speaker identification. The result of performing dominant speaker identification is an ordered list of all clients for which the media server has audio data. The list is ordered D, A, E, B, F, C. Using this list, and the rule that video data is forwarded only when a local client is within the top three of the ordered global list, the media server, in step 320, sends video data for A to the other media servers in the video conference.

Finally, in step 325, the media server sends audio and video data for the top three clients of the ordered global list (D, A, and E) to locally connected clients A, B, and C. Optionally, audio and video data of A is not sent back to A, as that data is unneeded.

Turning to FIG. 3B, a subscription is shown. FIG. 3B may occur during FIG. 3A. In step 350, the media server receives a request from local client C to subscribe to global (i.e., non-local) client F. The request is received through the user of client C clicking on an interface and selecting client F. In response, in step 355, the media server identifies the media server for which client F is local, and sends a subscription request to the media server for which client F is local.

In step 360, the media server for which client F is local has begun forwarding video data for F, and the media server receives video data for client F. In step 365, the media server then sends the audio and video data for client F to local client C. This way, local client C is able to see and/or hear client F even though client F is the second lowest ranked client on the ordered global list, and likely is not the dominant speaker.

Using this process, the bandwidth used in distributed conferences may be greatly reduced without reducing the effectiveness of the conference. The reduction may be accomplished through selectively forwarding less media data generally. For example, by sending media data of 2 out of 5 client computing devices, rather than all 5 client computing devices, amongst media servers. Alternatively, or in addition, the reduction may be accomplished by sending different types of media data. For example, by sending audio data for some, or all, client computing devices amongst media servers, then selectively sending video data for certain client computing devices. The reduction in bandwidth also reduces the memory and/or computing power needed for conferencing. Additionally, the invention has another advantage in that no centralized server is required to manage the conference. Each media server independently determines what media data to forward and is therefore able to achieve the above gains in efficiency without needing a centralized server to manage the conference.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
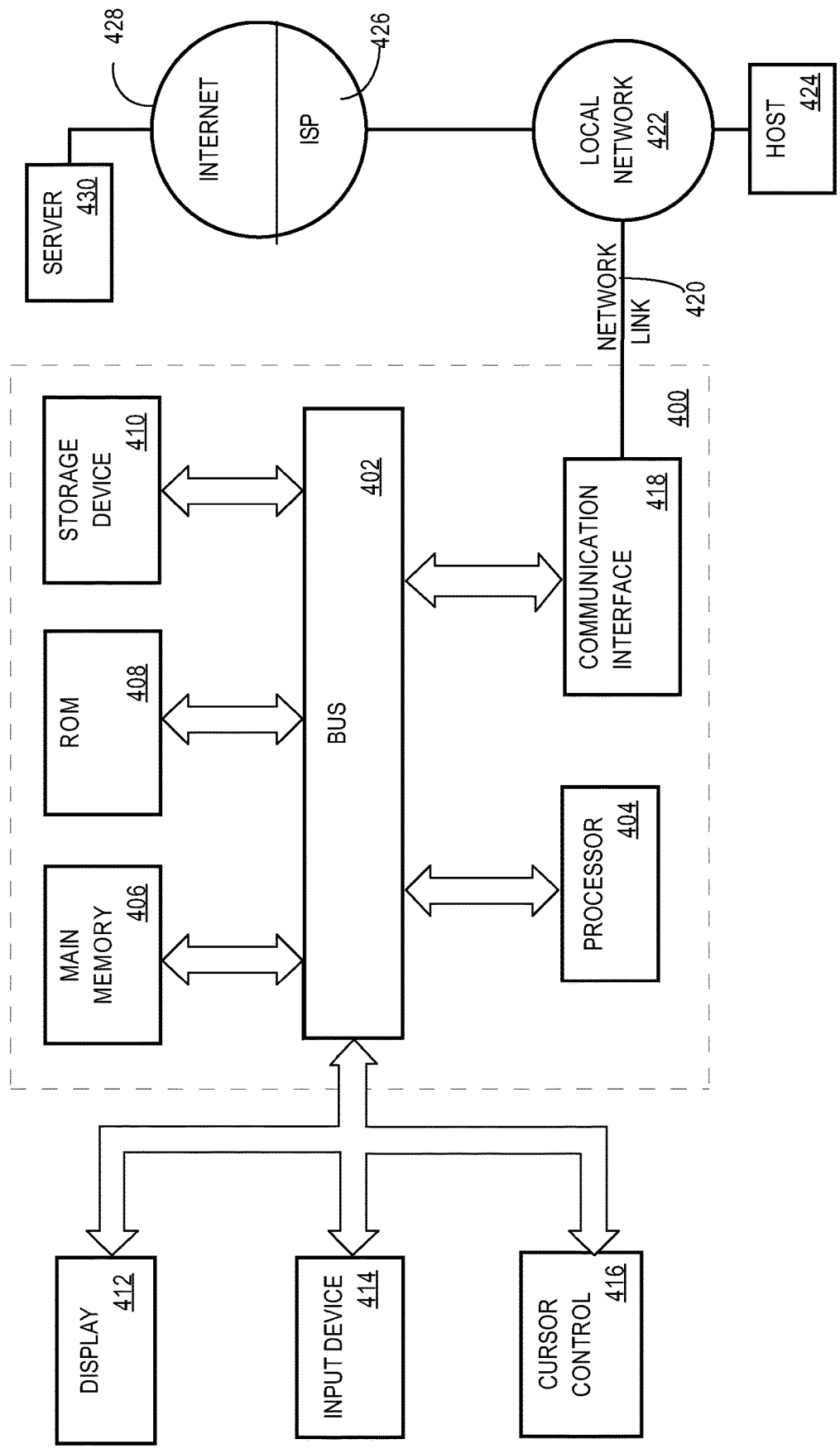
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   establishing, by a plurality of media servers, a video conference for a plurality of client computing devices, each of the plurality of media servers receiving audio data and video data from a local subset of the plurality of client computing devices;
   performing, by each of the plurality of media servers, dominant speaker identification to generate an ordered local list data that represents a likelihood of a particular client computing device of the local subset being a dominant speaker of the video conference;
   selecting, by each of the plurality of media servers, based on the ordered local list data, a portion of the local subset of the plurality of client computing devices for which to send audio data to other media servers of the plurality of media servers;
   sending, by each of the plurality of media servers, audio data associated with the portion of the local subset of the plurality of client computing devices to other media servers of the plurality of media servers;
   receiving, by each of the plurality of media servers, audio data associated with a corresponding portion of a local subset of the other media servers, from other media servers of the plurality of media servers;
   performing dominant speaker identification to generate score values for each client computing device of the plurality of client computing devices using the received audio data of each client computing device of the plurality of client computing devices, a particular score value representing a likelihood of a particular client computing device of the plurality of client computing devices being a dominant speaker of the video conference;
   generating, based on the score values generated in the dominant speaker identification and by each of the plurality of media servers, ordered global list data that identifies a subset of client computing devices for which to send video data to other media servers, wherein the subset includes the particular client computing device;
   based on the ordered global list data and by each of the plurality of media servers to other media servers of the plurality of media servers, selecting the particular client computing device of the plurality of client computing devices that satisfies a threshold value from the ordered global list data;
   sending video data for the only particular client computing device to other media servers of the plurality of media servers.

2. The method of claim 1, wherein the portion comprises unmuted client computing devices.

3. The method of claim 1, the plurality of media servers coupled to one another in a full mesh topology.

4. The method of claim 1, further comprising:
   receiving, by a particular media server of the plurality of media servers, a request to subscribe to a specific client computing device of the plurality of client computing devices from a particular client computing device of the local subset that is associated with the particular media server;
   sending, by the particular media server, a subscription request to a specific media server of the plurality of media servers, wherein the specific client computing device is local to the specific media server;
   in response to the subscription request, sending, by the specific media server, audio data and video data of the specific client computing device to the particular media server;
   sending, by the particular media server, the audio data and video data of the specific client computing device to the particular client computing device.

5. The method of claim 1, the threshold value encompassing three highest ordered positions of the ordered global list data.

6. The method of claim 1, further comprising:
each media server among the plurality of media servers sending received video data and associated audio data to the local subset of the plurality of client computing devices.

7. A computer system comprising:
a plurality of media servers, each media server comprising one or more processors and one or more memories storing one or more sequences of instructions for selective internal forwarding which, when executed by the one or more processors, cause the one or more processors to perform:
establishing, by a plurality of media servers, a video conference for a plurality of client computing devices, each of the plurality of media servers receiving audio data and video data from a local subset of the plurality of client computing devices;
performing, by each of the plurality of media servers, dominant speaker identification to generate an ordered local list data that represents a likelihood of a particular client computing device of the local subset being a dominant speaker of the video conference;
selecting, by each of the plurality of media servers, based on the ordered local list data, a portion of the local subset of the plurality of client computing devices for which to send audio data to other media servers of the plurality of media servers;
sending, by each of the plurality of media servers, audio data associated with the portion of the local subset of the plurality of client computing devices to other media servers of the plurality of media servers;
receiving, by each of the plurality of media servers, audio data associated with a corresponding portion of a local subset of the other media servers, from other media servers of the plurality of media servers;
performing dominant speaker identification to generate score values for each client computing device of the plurality of client computing devices using the received audio data of each client computing device of the plurality of client computing devices, a particular score value representing a likelihood of a particular client computing device of the plurality of client computing devices being a dominant speaker of the video conference;
generating, based on the score values generated in the dominant speaker identification and by each of the plurality of media servers, ordered global list data that identifies a subset of client computing devices for which to send video data to other media servers, wherein the subset includes the particular client computing device;
based on the ordered global list data and by each of the plurality of media servers to other media servers of the plurality of media servers, selecting the particular client computing device of the plurality of client computing devices that satisfies a threshold value from the ordered global list data;
sending video data for the only particular client computing device to other media servers of the plurality of media servers.

8. The system of claim 7, wherein the portion comprises unmuted client computing devices.

9. The system of claim 7, the plurality of media servers coupled to one another in a full mesh topology.

10. The system of claim 7, further comprising:
receiving, by a particular media server of the plurality of media servers, a request to subscribe to a specific client computing device of the plurality of client computing devices from a particular client computing device of the local subset that is associated with the particular media server;
sending, by the particular media server, a subscription request to a specific media server of the plurality of media servers, wherein the specific client computing device is local to the specific media server;
in response to the subscription request, sending, by the specific media server, audio data and video data of the specific client computing device to the particular media server;
sending, by the particular media server, the audio data and video data of the specific client computing device to the particular client computing device.

11. The system of claim 7, the threshold value encompassing three highest ordered positions of the ordered global list data.

12. The system of claim 7, further comprising:
each media server among the plurality of media servers sending received video data and associated audio data to the local subset of the plurality of client computing devices.

13. A computer-implemented method comprising:
establishing, by a first media server with other media servers including a second media server different from the first media server, a video conference with a first plurality of client computing devices and a second plurality of client computing devices, the first media server receiving media data from the first plurality of client computing devices, and the second media server receiving media data from the second plurality of client computing devices;
determining, by the first media server, one or more client computing devices of the first plurality of client computing devices for which to send associated audio data to the second media server;
sending, by the first media server, audio data associated with the one or more client computing devices to the second media server;
receiving, by the first media server, audio data associated with the second plurality of client computing devices from the second media server;
generating ordered global list data that identifies each client computing device for which the first media server has the audio data;
based on the ordered global list data, selecting, by the first media server, a particular client computing device that satisfies a threshold value from the ordered global list data;
sending, by the first media server, video data for only the particular client computing device to second media server.

14. The method of claim 13, wherein determining further comprises:
performing dominant speaker identification for the first plurality of client computing devices to generate ordered local list data that identifies each client computing device of the first plurality of client computing devices, wherein the particular client computing device is determined based on the ordered local list.

15. The method of claim 13, wherein the particular client computing device is an unmuted client computing device.

16. The method of claim 13, further comprising:
receiving, at the first media server, a request to subscribe to a second client computing device of the second plurality of client computing devices from a first client computing device that is associated with the first media server;
sending, by the first media server, a subscription request to the second media server;
receiving, at the first media server, audio data and video data of the second client computing device;
sending, by the first media server, the audio data and video data of the second client computing device to the first client computing device.

17. The method of claim 13, wherein the threshold value encompassing three highest ordered positions of the ordered global list data.

18. The method of claim 13, further comprising:
sending, by the first media server, received video data and associated audio data to the first plurality of client computing devices.

19. A computer system comprising:
a first media server and a second media server, each comprising one or more processors and a memory storing instructions which, when executed by the one or more processors, cause to:
establish, by the first media server with other media servers including the second media server different from the first media server, a video conference with a first plurality of client computing devices and a second plurality of client computing devices, the first media server receiving media data from the first plurality of client computing devices, and the second media server receiving media data from the second plurality of client computing devices;
determine, by the first media server, one or more client computing devices of the first plurality of client computing devices for which to send associated audio data to the second media server;
send, by the first media server, audio data associated with the one or more client computing devices to the second media server;
receive, by the first media server, audio data associated with the second plurality of client computing devices from the second media server;
generating ordered global list data that identifies each client computing device for which the first media server has the audio data;
based on the ordered global list data, selecting, by the first media server, a particular client computing device that satisfies a threshold value from the ordered global list data;
send, by the first media server, video data for only the particular client computing device to second media server.

* * * * *